United States Patent [19]

Arao et al.

[11] Patent Number: 4,951,559
[45] Date of Patent: Aug. 28, 1990

[54] BREAD PRODUCING MACHINE

[75] Inventors: Yuzuru Arao, Takatsuki; Morio Shibata, Amagasaki; shigeru Yamaguchi, Kashihara; Hirofumi Nakakura, Toyonaka; Tsuneo Shibata; Yukitoshi Kunihiro, both of Kawanishi, all of Japan

[73] Assignee: Matsushita Electric Industrial Co., Ltd., Osaka, Japan

[21] Appl. No.: 340,093
[22] PCT Filed: May 27, 1988
[86] PCT No.: PCT/JP88/00516
§ 371 Date: Jan. 30, 1989
§ 102(e) Date: Jan. 30, 1989
[87] PCT Pub. No.: WO88/09143
PCT Pub. Date: Dec. 1, 1988

[30] Foreign Application Priority Data

May 29, 1987 [JP] Japan .................. 62-135284

[51] Int. Cl.⁵ .................. A21D 8/00; A47J 27/00
[52] U.S. Cl. .................. 99/348; 99/468; 366/98; 366/146
[58] Field of Search .................. 99/348, 352, 353, 483, 99/484, 486, 328, 329 R, 331, 467, 468; 366/69, 98, 144–146; 426/504, 512

[56] References Cited

U.S. PATENT DOCUMENTS

| | | | |
|---|---|---|---|
| 4,538,509 | 9/1985 | Ojima et al. | 366/98 |
| 4,762,057 | 8/1988 | Hirota et al. | 99/468 |
| 4,776,265 | 10/1988 | Ojima | 99/348 |
| 4,836,683 | 6/1989 | Aoyama | 99/348 |
| 4,844,048 | 7/1989 | Aruga et al. | 99/348 |

FOREIGN PATENT DOCUMENTS 62-5320 1/1987 Japan .
61-34037 6/1987 Japan .
62-86882 6/1987 Japan .

Primary Examiner—Timothy F. Simone
Attorney, Agent, or Firm—Wenderoth, Lind & Ponack

[57] ABSTRACT

A bread producing machine comprises a baking case for accommodating bread materials, a baking chamber for accommodating the baking case, a mixing, kneading means for mixing, kneading the bread materials within the baking case, a heating means for heating the baking case, an air inlet route and an exhaust route including the baking chamber a fan for compulsory blast use is disposed in the course of the exhaust rate. The exhaust route is located at its one end above the baking case so as to confront the upper portion side wall of the baking chamber as an air inlet port, and confronts at its other end an outer side exhaust port provided in an outer cover. The ventilation by the driving operation of the fan becomes a suction type, such that the baking chamber is set in the negative pressure region so that the steam venting step after the bread baking step positively and quickly exhausts the steam existing not only on the top surface of the bread, but also in the gap between the bread periphery and the bread baking case.

4 Claims, 15 Drawing Sheets

BREAD PRODUCING MACHINE

FIELD OF TECHNOLOGY

The present invention relates to a bread producing machine which is capable of automatically effecting a series of mixing, kneading, fermenting and baking steps so as to bake bread within the predetermined time requiring only the throwing-in of bread materials.

BACKGROUND ART

Generally there are many things as elements for positively producing bread, but steam venting after the baking may be mentioned as one among them. Namely, when the steam venting after the baking is not effected properly, a dewing phenomenon is caused in the produced bread, so that the bread becomes sticky, or the bread becomes contracted in appearance, thus making it impossible to be baked soft and full.

Accordingly, it may be recognized that steam venting is a compulsory venting operation of the baking chamber interior. FIG. 16 shows a conventional bread producing machine, which has a heating means 1 such as a heater or the like, a baking case 5, which is provided with a mixing, kneading means 4 such as a blade or the like disposed detachably within a baking chamber 3 which is adapted to opened and closed at the upper portion by a cover 2. An air inlet route 6 is disposed to introduce air into the baking chamber 3 which also has a hole-shaped exhaust route 7 formed in the cover 2. In the ventilation within the baking chamber 3, the air is force to fed into the baking chamber 3 by the driving operation of a fan 8 disposed in the air inlet route 6, so that the steam is discharged from the exhaust route 7.

In the bread producing machine up to this time, a so-called forced type of ventilation is provided by the fan 8 disposed in the air inlet route 6 to force the air into the baking chamber 3 so that there is bound to become a positive pressure zone within the baking chamber 3. But the steam exists even in the gap between the bread periphery and the baking case 5, in addition to the upper surface of the bread. It is generally known that the gap is formed in the baking step.

However, in the conventional forced type, there are no problems in particular in terms of the steam exhaust on the top surface of the bread, but the steam existing in the gap between the bread periphery and the baking case 5 is depressed inversely and is prevented from being discharged as the baking chamber 3 becomes a positive pressure zone as described hereinabove. Accordingly, in the conventional construction, dewing was caused especially in the peripheral face of the bread to prevent the expected object from being achieved.

BRIEF SUMMARY OF THE INVENTION

In order to remove the above-described problems, the bread producing machine of the present invention comprises a baking case for accommodating bread materials, a baking chamber for accommodating the baking case, a mixing, kneading means for mixing, kneading the bread materials placed within the baking case, a heating means for heating the baking case, an air inlet route and an exhaust route including the baking chamber, a fan for compulsory blast use is disposed in the course of the discharge route, the exhaust route is positioned, at its one end, above the baking case to confront the upper portion side wall of the baking chamber so as to be provided as an air inlet, and is, at its other end, provided so as to confront the outer side exhaust port disposed in the outer cover.

According to the above-described construction, the air within the baking chamber is sucked from the air inlet port first by the driving operation of the fan to introduce the air into the baking chamber through the air inlet route, and the air is discharged from an external side exhaust port disposed on the outer cover through the exhaust route. Namely, the baking chamber is set in a negative pressure region as it becomes a ventilation form of an attraction type, with a result that the steam existing in the gap between the bread periphery and the baking case, not to mention the steam on the top surfaces of the bread, is sucked out so as to be positively discharged.

DETAILED DESCRIPTION OF THE INVENTION

Figure 1:
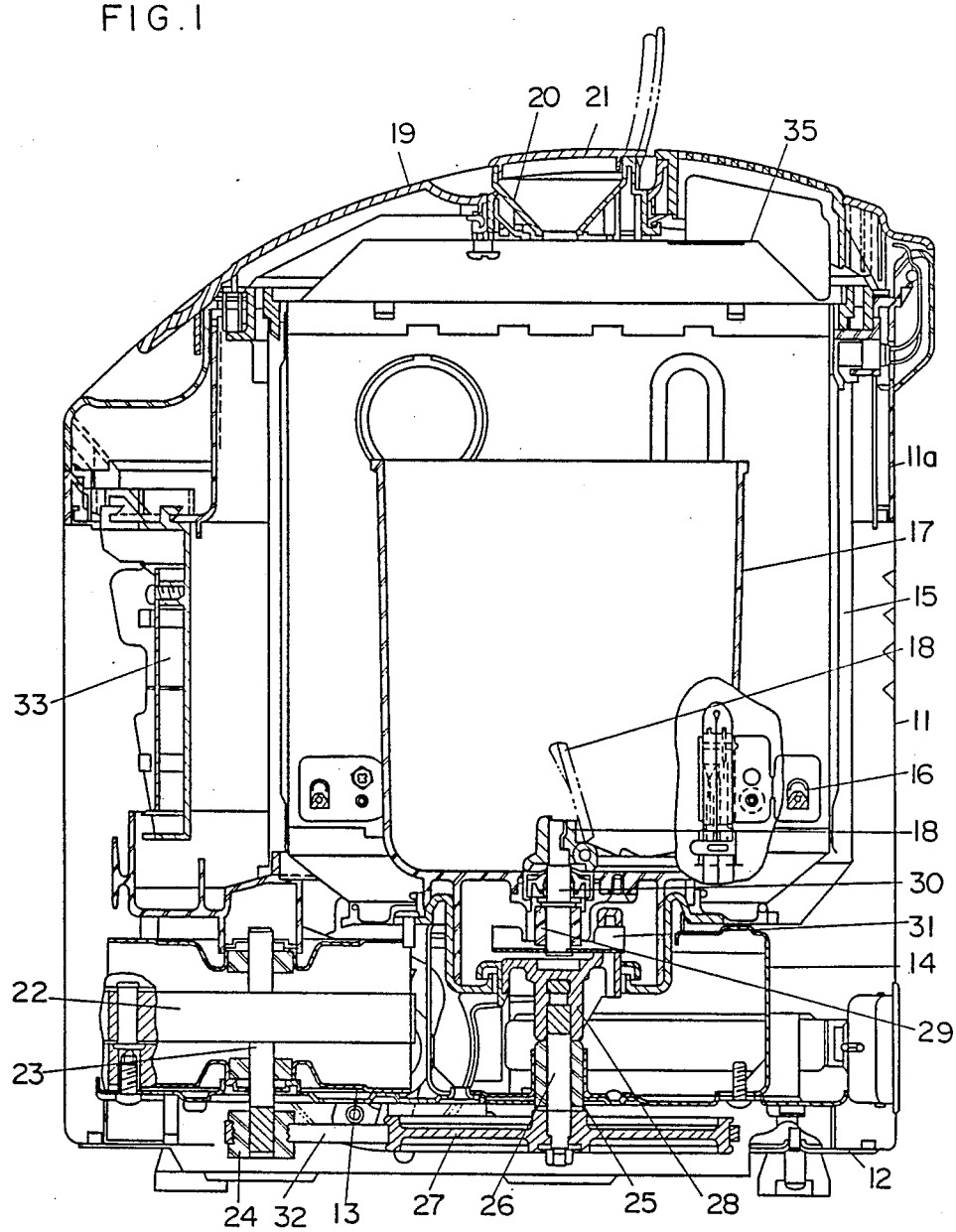
FIG. 1 through FIG. 5 are longitudinally sectional face of a bread producing machine showing one embodiment of the present invention.

One embodiment of the present invention will be described hereinafter with reference to the accompanied drawings. In FIG. 1 through FIG. 10, 11 is a bread producing machine main body, 12 is a reverse plate for covering a lower end opening portion of the main body 11, with a lower angle 13 being mounted on the reverse plate 12. 14 is an upper angle secured to one portion of the lower angle 13, with a baking chamber 15 being mounted on the top face of the upper angle 14. An approximately C-shaped electric heater 16 is mounted on the inward lower portion side wall of the baking chamber 15. 17 is a bottomed cylindrical baking case which is detachably disposed within the baking chamber 15 so as to accommodate the bread materials, with a freely-rising, -falling kneading blade 18 which mixes, kneads the bread materials being rotatably provided on the inner bottom portion of the baking case 17. 19 is an outer cover, whose one end portion is pivotally supported by a shaft on a ceiling frame 11a located on the top portion of the main body 11, and the outer cover 19 covers the upper end opening portion of the baking chamber 15 for a free opening, closing operation. A yeast cell 20 is provided at an approximately central portion thereof, and the top end opening portion of the yeast cell 20 is adapted to be opened, closed by the yeast opening, closing cover 21.

22 is a flat type of kneading motor which is disposed so that one portion thereof may be projected, outwardly of the side face of the baking chamber 5, downwardly of the baking chamber 15, with the kneading motor 22 being mounted on the top face of the lower angle 13 and positioned sidewardly of the upper angle 14. The kneading motor 22 further has a rotary shaft 23, with a small pulley 24 being secured at the lower end of the rotary shaft 23. 25 is a bearing which is pressed fixingly into one portion of the lower angle 13. The bearing 25 has a rotary shaft 26, with a large pulley 27 being secured onto the lower end of the rotary shaft 26 and a lower connector 28 being fittingly inserted under pressure into the upper end. 29 is a bearing disposed downwardly on the bottom portion of the baking case 17. A rotary shaft 30 is disposed in the bearing 29 and an upper connector 31, which is detachably engaged with the lower connector 28 when the baking case 17 has been disposed within the baking chamber 15, is secured onto the lower end of the rotary shaft 30. The upper end of shaft 30 projects into the baking case 17, with the kneading blade 18 being detachably mounted onto the upper end. Also, a belt 32 is entrained between the small pulley 24 and the large pulley 27, such that the power of the kneading motor 22 is transmitted onto the kneading blade 18 through the small pulley 24, the belt 32, the large pulley 27, the lower connector 28, and the upper connector 31 to rotate the kneading blade 18.

33 is a control apparatus for controlling each step of the mixing, kneading, aging, fermenting and baking. The controlling apparatus 33 is positioned upwardly of the projected portion of the kneading motor 22, is disposed sidewardly of the baking chamber 15 and is secured onto the lower face of the above-described ceiling frame 11a.

34 is a temperature sensor composed of a thermistor, which is positioned between both the end portions of the heater 16 and is disposed on the side wall of the baking chamber 15. The temperature sensor 34 is urged so as to normally project into the baking chamber 15 and come into contact against the outer side wall of the baking case 17 when the baking case 17 has been engaged within the baking chamber 15 so as to control the heater 16, etc. through detection of the temperature of the baking case 17. 35 is an inner cover disposed on the lower end portion of the yeast cell 20. The inner cover 35 has a yeast opening, closing plate 36 provided in a position corresponding to the lower end opening portion of the yeast cell 20.

Between the outer cover 19 and the inner cover 35, there are provided an air inlet route 40 leading to the top portion of the baking chamber 15 through an outer side air inlet port 37 provided on the outer cover 19, an air inlet space 38, an inner side air inlet port 39 having a filter disposed on the inner cover 35, an exhaust space 43 communicating respectively at its one end with the outer side exhaust port 41 disposed in the outer cover 19, and at its other end with the inner side exhaust port 42, and the air inlet space 38 and the exhaust space 43 are partitioned by a bulkhead 45 having a bypass route 44.

46 is an exhaust duct with a fan 48, which is rotatably driven by a motor 47, for blast use disposed therein. One end of the exhaust duct 46 is open on the upper portion side wall of the baking chamber 15 as an air inlet 49, the other end is open above the ceiling frame 11a to correspond to the above-described inner side exhaust port 42, and at least the exhaust lowering portion 50 is adapted to be formed with the half way being U-shaped. The exhaust route 51 is formed of the exhaust duct 46, the inner side exhaust port 42, the exhaust space 43 and the outer side exhaust port 41.

Figure 8:
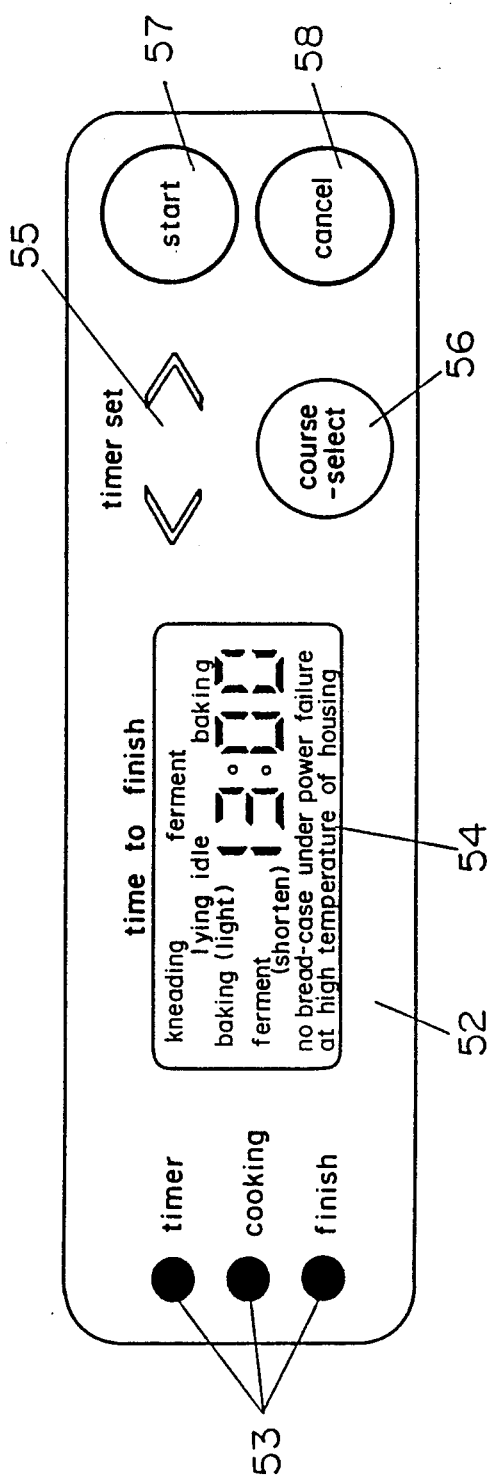
FIG. 8 is a front face view of an operation portion in the bread producing machine thereof.
Figure 9:
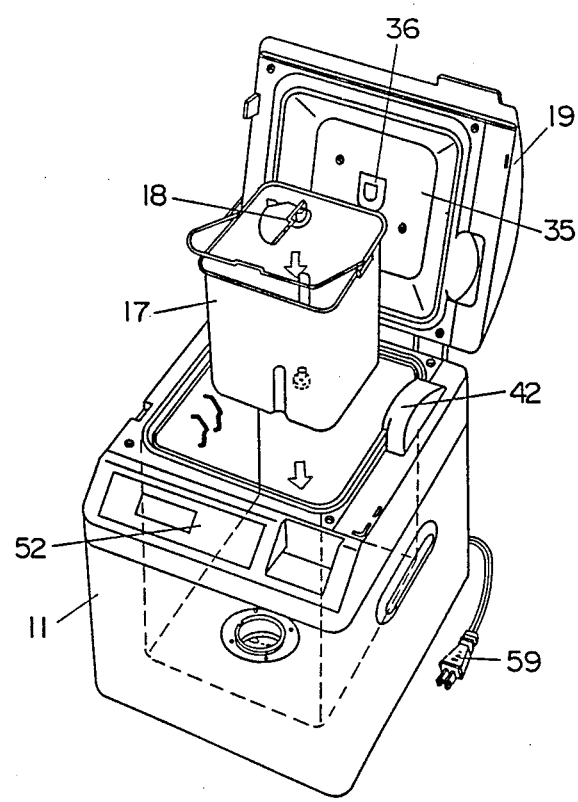
FIG. 9 and FIG. 10 are perspective views each showing the bread producing machine, whose cover is open.
Figure 10:
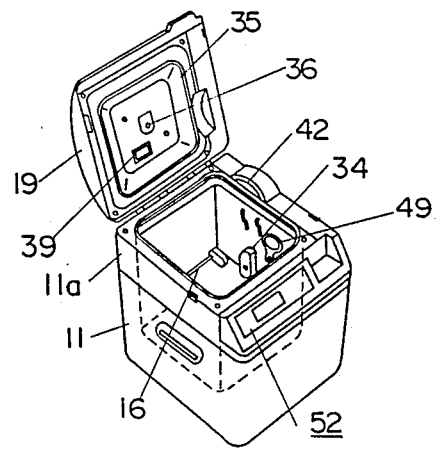

52 is an operating portion disposed on the ceiling frame 11a mounted on the top end portion of the bread producing machine main body 11. The operating portion 52 as shown in FIG. 8, is equipped with a display lamps 53 composed of light emitting diodes for effecting the displays of "timer", "cooking" and "completion", display portion 54, a timer set key 55 to be depressed in the setting of the timer, a course select key 56 to be depressed in selecting the courses of baking finish (light), fermenting and baking finish (shortening), a start key 57 to be depressed to start the timer, and a cancellation key 58 to be depressed to the timer set or the cooking.

In the above-described construction, the process of bread production will be simply described. At first, kneading blade 18 is set into the baking case 17 and bread materials such as wheat flour, sugar, skim milk, salt, butter, water, etc. except for yeast are put into the baking case 17. Thereafter, the baking case 17 is engaged within the baking chamber 15. Then, the outer cover 19 is closed and yeast opening, closing cover 21 is opened to put the yeast into the yeast cell 20. The yeast opening, closing cover 21 is then closed. Thereafter, a power supply plug 59 is inserted into a plug receiver for household use. In this condition, a start key 57 is depressed. In this case, when the baking is required to be effected in a baking up course of a standard type, depress only the start key 57 and a time (four hours) required is displayed on the display portion 54 to immediately start the operation. When the baking is required to be baking (light) in the baking color, depress the course select key 56 to display the baking (light) on the display portion 54, and depress the start key 57 and a time (four hours) required is displayed on the display portion 54 to immediately start the operation. When the baking (shortening) course is used for a fast baking operation, depress the course select key 56 to display baking (shortening) on the display portion 54, and depress the start key 57 to display the time (two hours, forty-five minutes) required on the display portion 54 so as to immediately start the operation.

Furthermore, the timer can not be used in the "baking (shortening)" course (two hours, forty-five minutes) and the "as far as the fermentation" course (one hour, fifty-five minutes), but the other courses, i.e, the "baking" course and "baking (light)" course the timer may be used. When the timer is used, for example, when the baking is required to be finished at 6:30 on the morning of the next day with the present time being 9:00 at night, the difference in the time, i.e., nine hours, thirty minutes is displayed on the display portion 54 of the timer. The time is set through the depression of the timer set key 55. Depress the start key 57 in this condition, and the timer starts to begin the preliminary kneading operation, thus resulting in baked bread after the lapse of the predetermined time, i.e., after the lapse of nine hours, thirty minutes.

In the step of bread production, in the case of the standard (four hours) course, the preliminary kneading operation is first effected and after the constant aging time provided, dry yeast is automatically thrown into the baking case 17 to effect the kneading again and thereafter to go into the fermenting step. When the step moves into the fermenting step, a degassing operation accompanying the mixing, kneading operation is effected at a certain period to advance into a primary fermenting, a secondary fermenting, a third fermenting, a mold fermenting, and then, into a baking step. And after the baking step has been completed, a fan 48 rotatably driven by the motor 47 for blast use is driven for a constant time to effect the forced ventilation of the baking chamber 15 so as to complete the steam venting step.

In the steam venting step, as a fan is provided on an exhaust route 51, the baking chamber 15 is placed under a negative pressure region. Accordingly, the steam existing in the gap between the periphery of the bread, caused by the contraction of the bread after the baking, and the baking case 17, in addition to the steam above the baking chamber, is exhausted positively and quickly. Namely, the open air is absorbed from the outer side air inlet port 37 disposed in the outer cover 19 by the rotation of the fan 48 and the open air reaches the top portion of the baking chamber 15 through the air inlet space 38, the inner side air inlet port 39 having a filter provided on the inner cover 35, and is sucked onto the fan 48 through the exhaust lowering portion 50 from an air inlet port 49 open in the upper portion side wall of the baking chamber 15. Thereafter the air is exhausted from the inner side exhaust port 42 open above the ceiling frame 11a through the exhaust duct 46 by the fan 48, and is exhausted from the outer side exhaust port 41 provided in the outer cover 19 through the exhaust space 43. As the baking chamber 15 is placed into the negative pressure region by the forced ventilation of the air, not only the steam above the baking chamber 15, but the steam existing in the gap between the periphery of the bread caused through the contraction of the bread after the baking operation and the baking case 17 is exhausted in such a form as to be sucked out. In this case, the steam venting function works effectively through the whole bread, so that stickiness caused by dewing are removed, thus resulting in swollen, delicious bread.

The exhaust is finally discharged into the atmosphere from the outer side exhaust port 41 provided in the outer cover 19, with a portion being circulated again into the baking chamber 15 through a bypass route 44 of the bulkhead 45. The recirculation of the exhaust including the moist air is effective in terms of preventing the excessive drying of the baking chamber 15, with this function preventing the outer skin of the bread from becoming excessively thicker, and besides, the bread may be softly retained.

Furthermore, as the air inlet port 49 of the exhaust route 51 is located above the baking case 17 so as to be confronted with the upper portion side wall of the baking chamber 15, there is little influence of the ventilation flow upon the baking case 17. This fact has the effect of controlling the cooling of the baking case 17 as much as possible, making it difficult to cause dewing.

By such functions as described hereinabove, more swollen delicious bread is provided.

Also, when a high speed (shortening) course has been set, a series of steps, which are the same as the standard (four hours) course, i.e., preliminary kneading, aging, kneading, primary fermentation, degassing, secondary fermenting, degassing, third fermenting, degassing, mold fermenting, baking, steam venting are effected in two hours, forty-five minutes.

Figure 11:
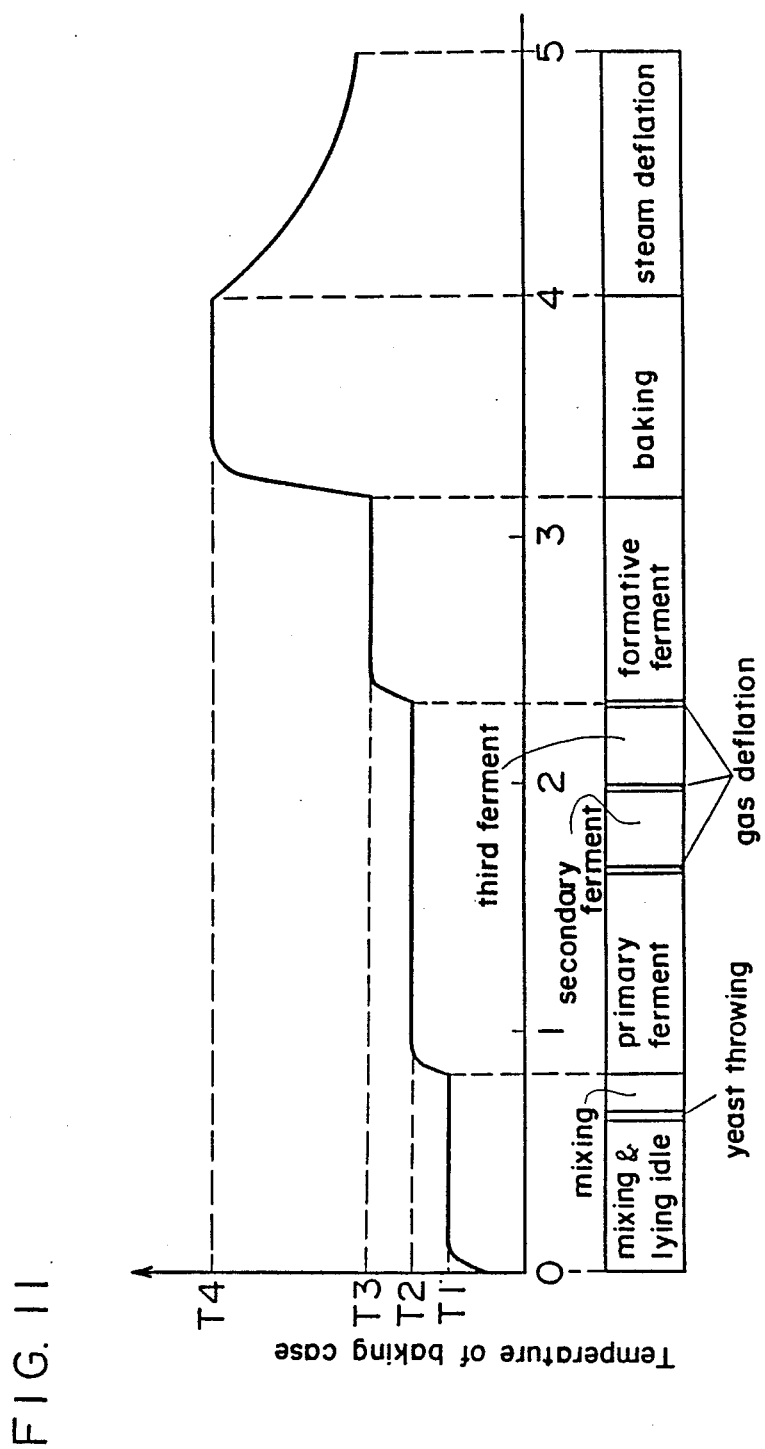
FIG. 11 is a process step chart showing a producing step of the bread producing machine thereof.
Figure 12:
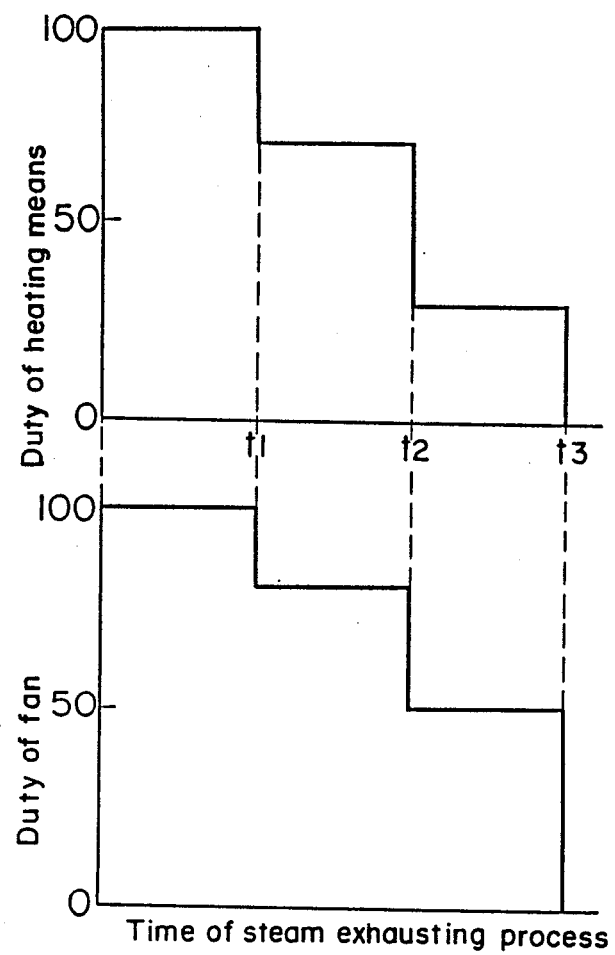
FIG. 12 is a chart showing an energization ratio of a fan and a heating means in the bread producing machine thereof.
Figure 13:
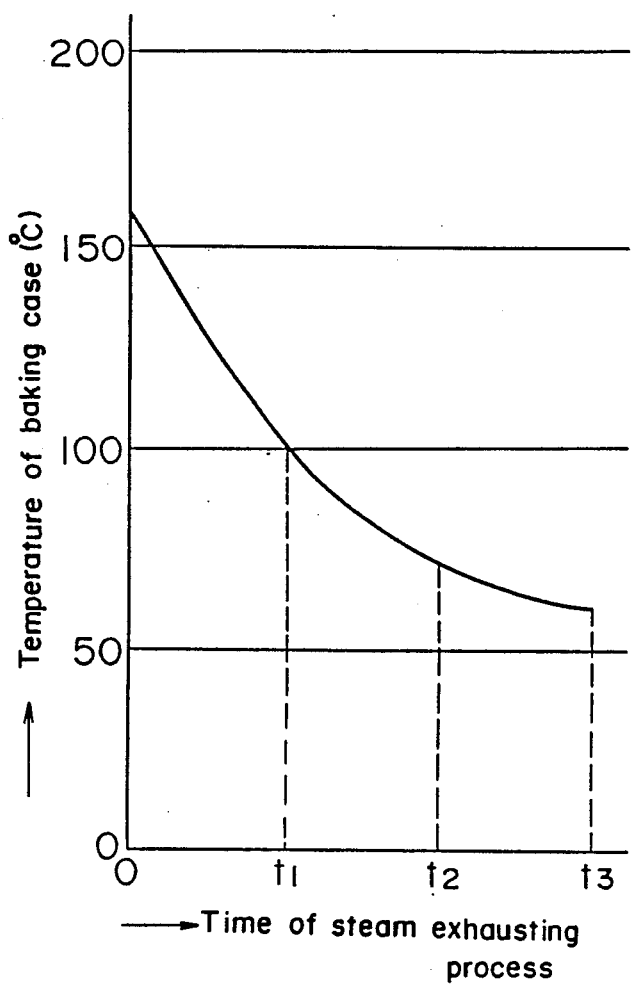
FIG. 13 is a chart showing a temperature transition of a baking case in the bread producing machine thereof.

FIG. 11 shows a process step chart of a bread producing machine in one embodiment of the present invention, FIG. 12 shows an energization ratio of a fan and a heating means in the bread producing machine, and FIG. 13 shows a temperature transition of the baking case in the bread producing machine.

In accordance with FIG. 11, the steps of bread production will be described. First, start an operation with bread materials such as wheat flour, sugar, skim milk, salt, butter, water, etc. being thrown into the baking case 17, and then the bread materials are mixed, kneaded, and after the interval of the constant aging time, the dry yeast is thrown into the baking case 17 and the mixing, kneading operation is effected again. After the completion of the mixing, kneading operation, the step goes into the fermenting step. In this fermenting step, a degassing which accompanies the mixing, kneading operation at a certain period is effected, the step advances into the primary fermenting, the secondary fermenting, the third fermenting, the mold fermenting, and then into the baking step. After the completion of the baking step, the fan 48 is driven only for a constant time to effect the forced ventilation of the baking chamber 15 and also the heating means 16 is energized to effect a steam venting step.

As noted, as the fan 48 is provided on the exhaust route 51, in the steam venting step the baking chamber 15 is placed under a negative pressure region, so that needless to say the steam above the baking chamber 15 and the steam existing in the gap between the periphery of the bread caused through the accommodation (deformation) of the bread after the baking is positively and quickly exhausted.

Furthermore, as the steam venting operation is effected by the driving operation of the fan 48, a fall in the temperature of the baking case 17 and the bread caused (in this case, especially the bottom corner portion and its vicinity of the baking case 17 is easy to cool earlier), forming dew so as to make the bread splash. However, in one embodiment of the present invention, the bread does not splash, because the heating means 16 is adapted to be energized during the steam venting operation.

In such steam venting step as described hereinabove, if the fan 48 is driven and also the heating means 16 is energized, the steam venting function works effectively through the whole bread, and the dewing phenomenon is not caused, so that bread sticking, etc. caused by dewing are removed, thus producing swollen, delicious bread.

In the steam venting step when the fan 48 and the heating means 16 are fully energized, the bread is dried to harden the outer skin. However, in one embodiment of the present invention, as shown in FIG. 12, the energization ratio (duty) of the fan 48 and the energization ratio (duty) of the heating means 16 are adapted to be reduced as time passes, in this case the number of revolutions of the fan 48 is reduced through the reduction in the energization ratio of the fan 48, so that the temperature drop of the baking case 17 is delayed as shown in FIG. 13. The bread does not become excessively dry as the energization ratio onto the heating means 16 is adapted to be reduced, thus preventing the bread outer skin from becoming hardened.

Also, as the air inlet and the exhaust are adapted to be effected in the location of the outer cover 19 provided above the main body, sanitary conditions are maintained because dust, small insects, etc. are not sucked in as in some arrangements which introduce the air from the installation face of the main body.

Figure 14:
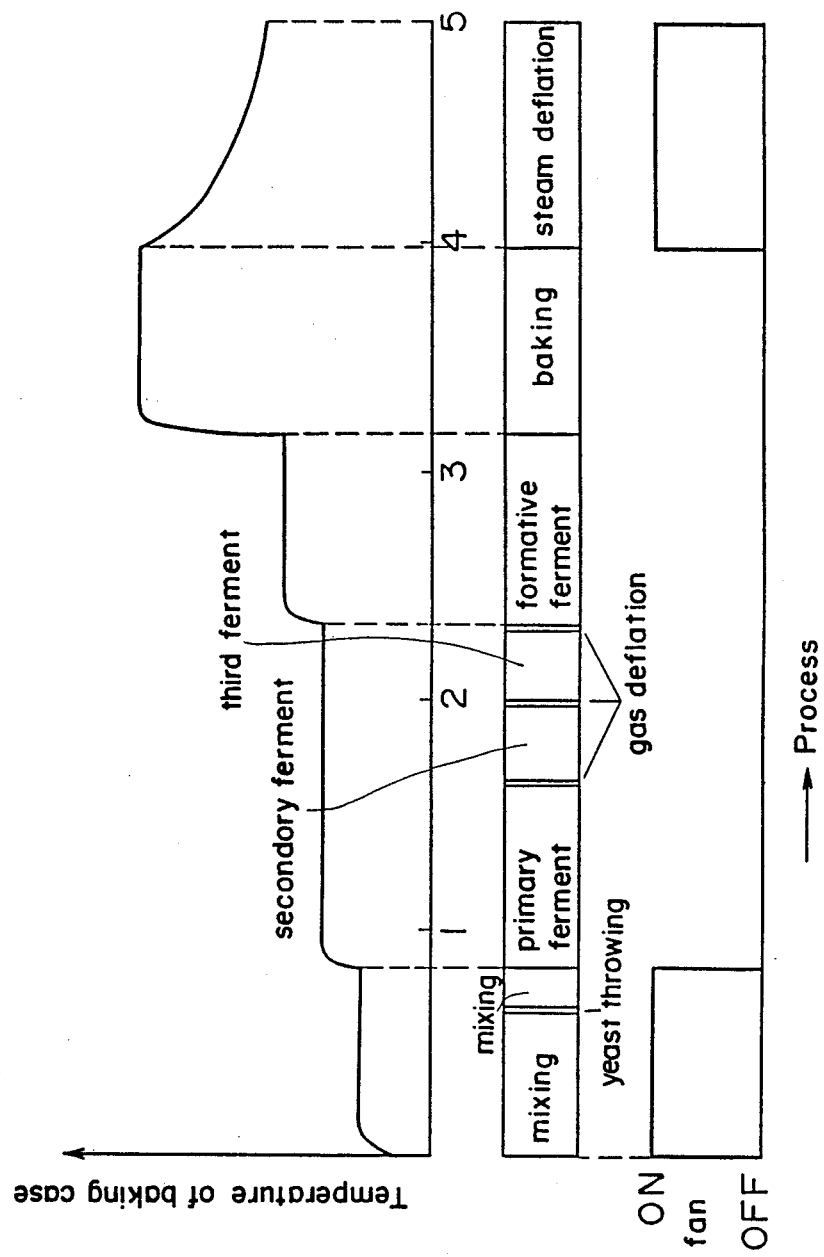
FIG. 14 is a process step chart of a bread producing machine in the other embodiment of the present invention.
Figure 15:
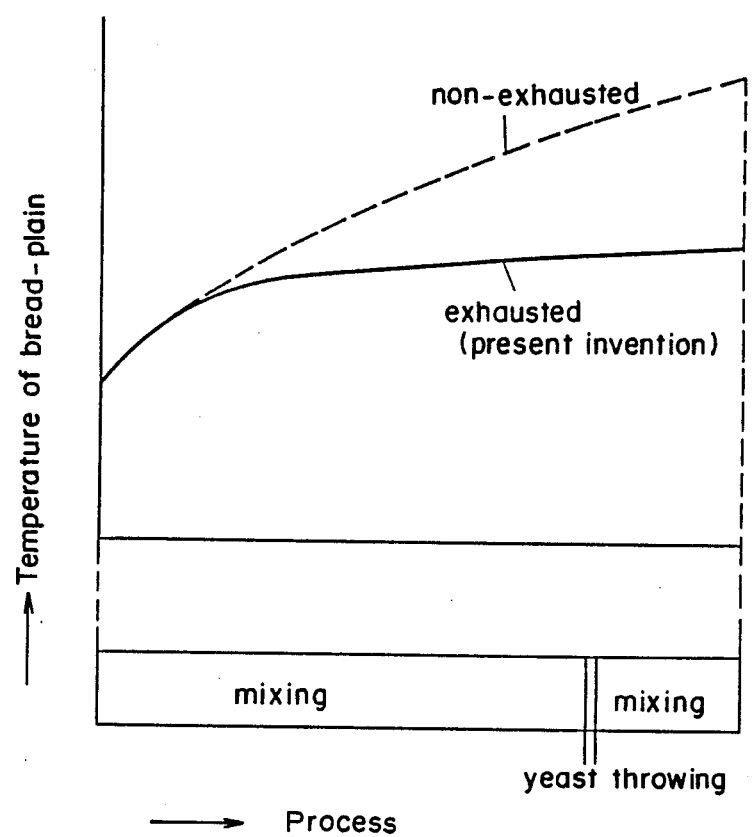
FIG. 15 is a chart showing the bread nature when the exhausting has been effected in the bread producing machine thereof and when the exhausting has not been effected therein.
Figure 16:
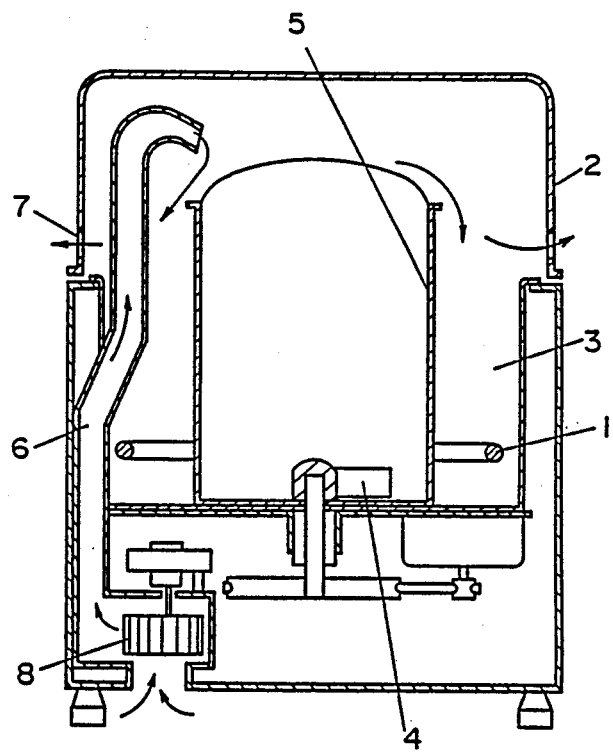
FIG. 16 is a longitudinally sectional view of a bread producing machine showing the conventional embodiment.

FIG. 14 shows a process step chart of a bread producing machine in another embodiment of the present invention, and FIG. 15 shows a graph of the temperature of the bread raw materials when the air has been exhausted in the bread producing machine and when the air has not been exhausted.

The steps of the bread production of the bread producing machine in the other embodiment of the present invention will be described in accordance with FIG. 14. First, start the operation with bread materials such as wheat flour, sugar, skim milk, salt, butter, water, etc. being thrown into the baking case 17, and then the bread materials are mixed, kneaded and after the interval of a constant aging time, dry yeast is thrown into the baking case 17 and the mixing, kneading operation is effected again. After the mixing, kneading has been completed, the step goes into the fermenting step. In this fermenting step, the degassing step which accompanies the mixing, kneading operation at a period is effected, the step advances into the primary fermenting, the secondary fermenting, the third fermenting, the mold fermenting, then, into the baking step. After the completion of the baking step, finally the steam venting step is effected.

Figure 2:
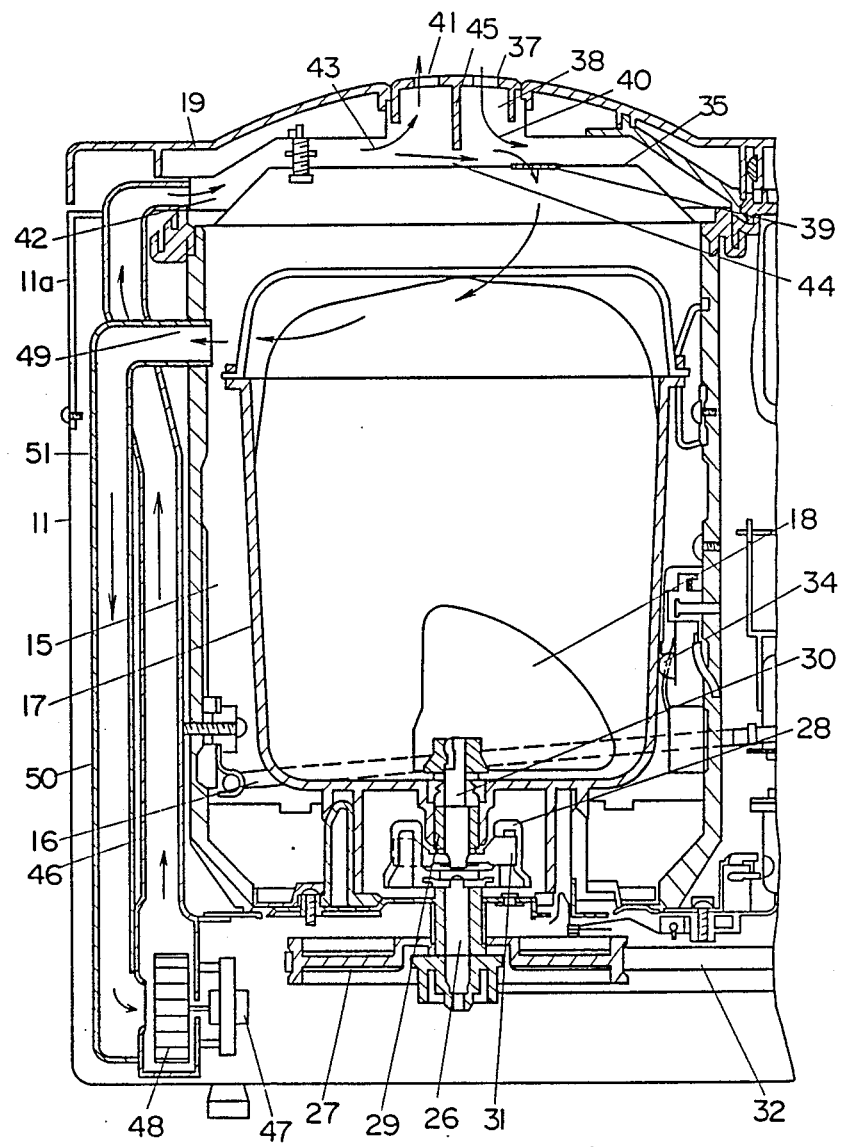
Figure 3:
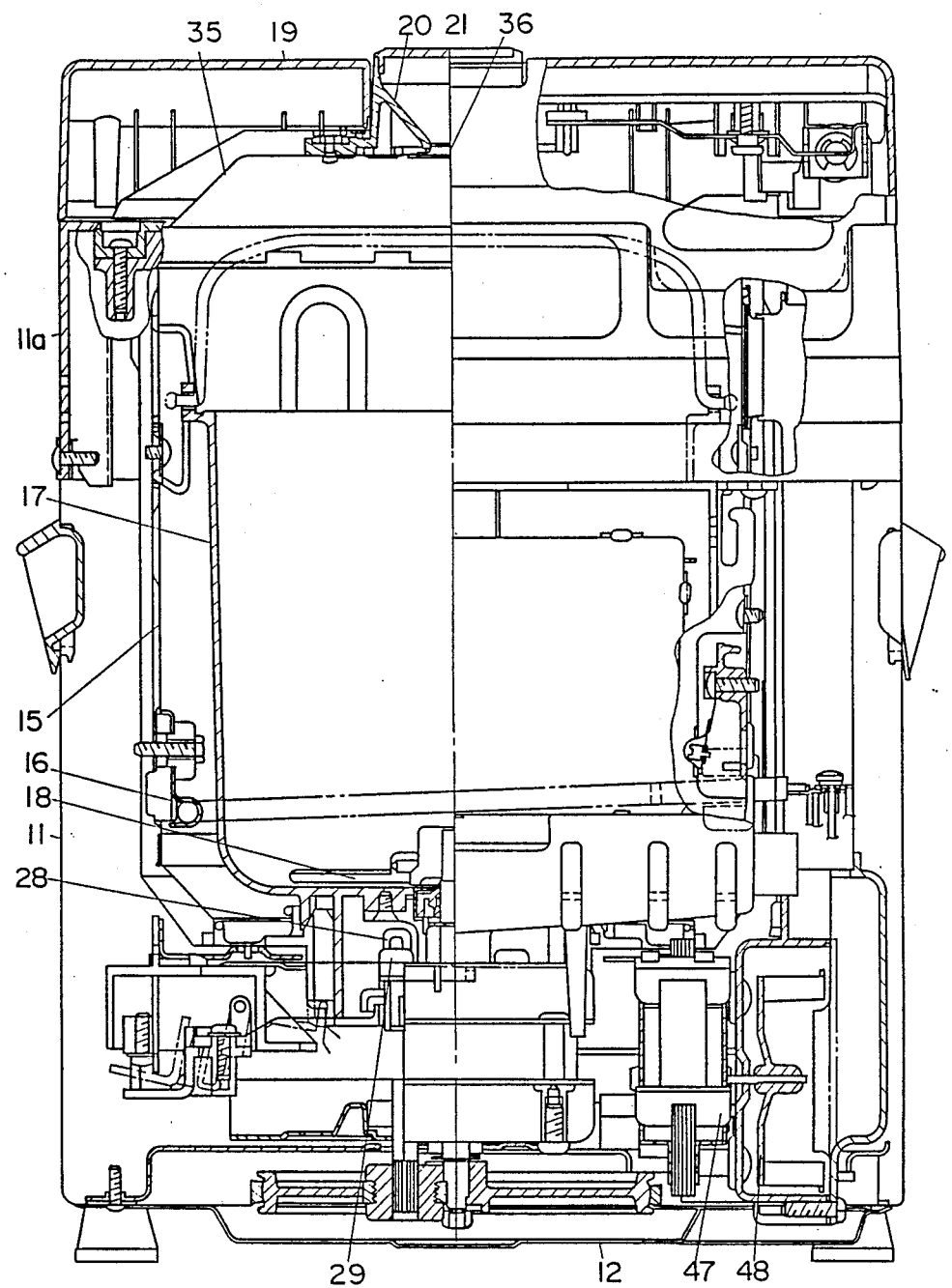
Figure 4:
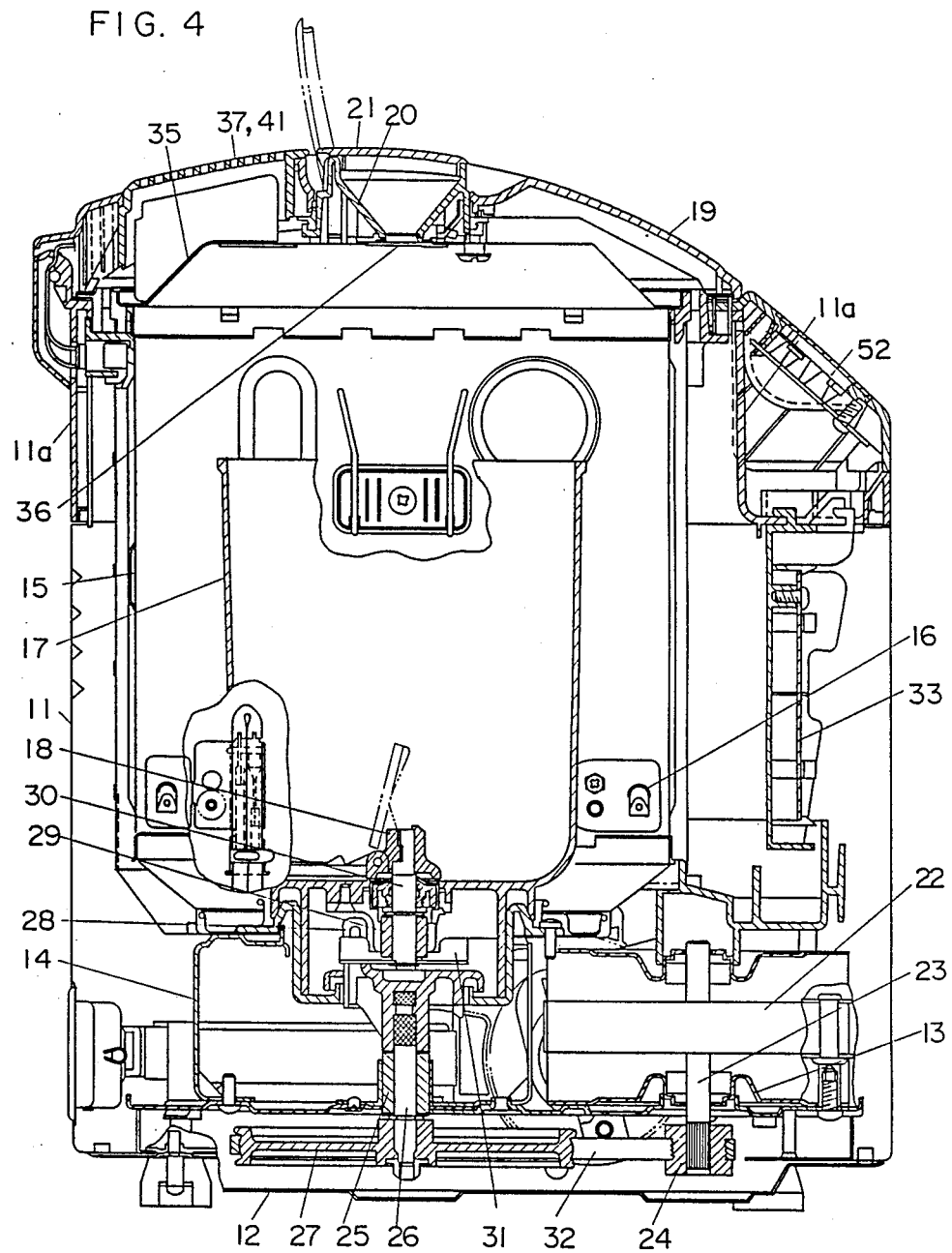
Figure 5:
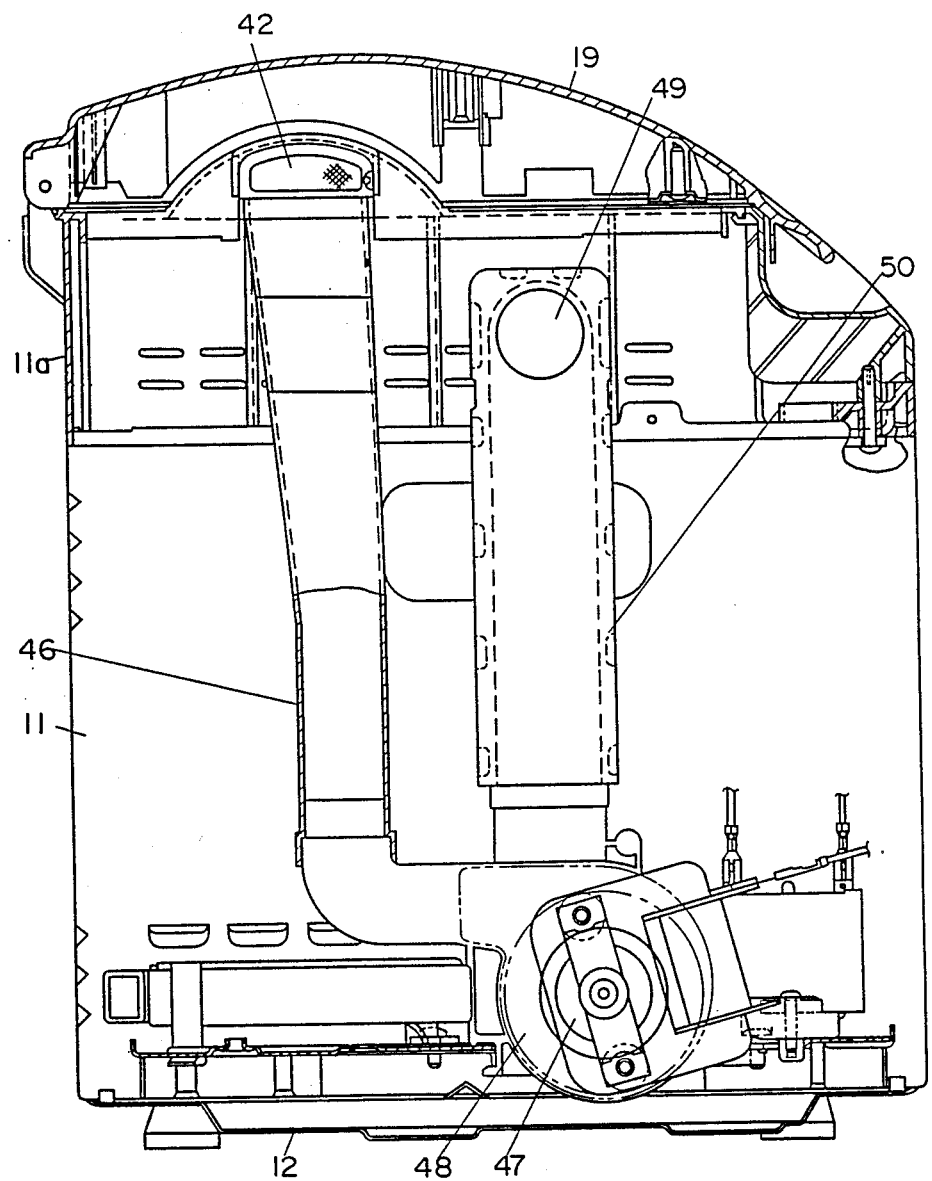
Figure 6:
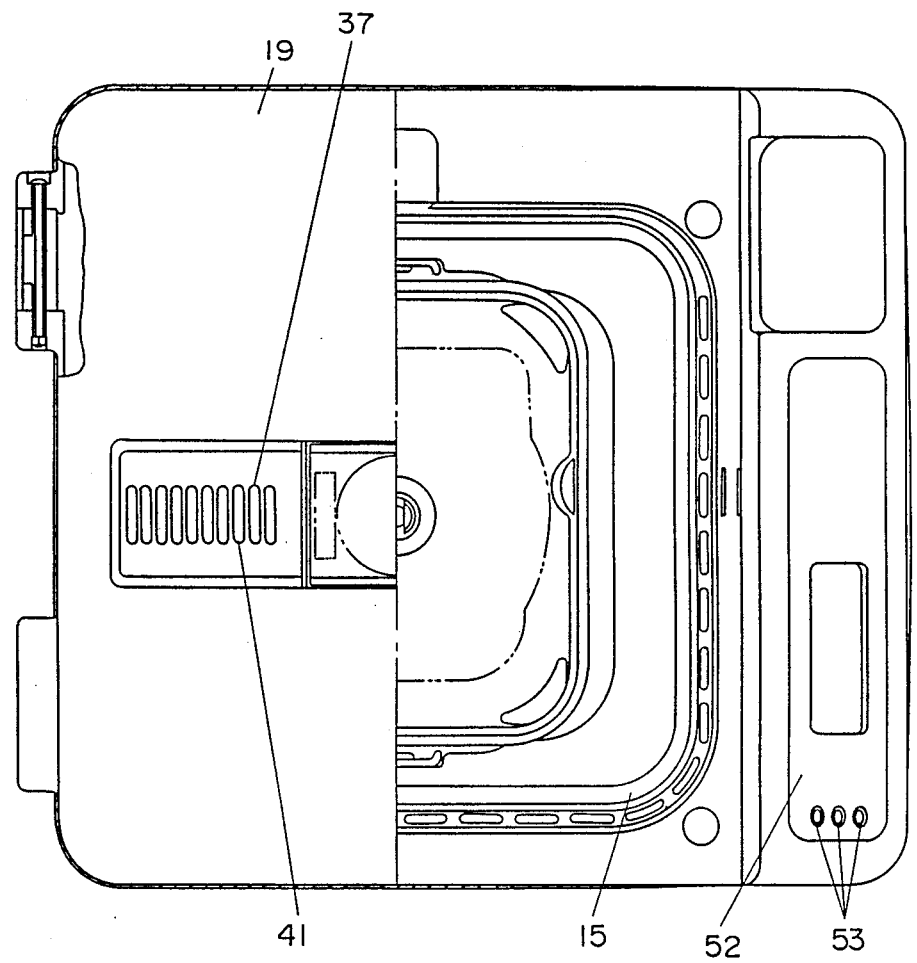
FIG. 6 is a top face view showing, in section, one portion of the bread producing machine thereof.
Figure 7:
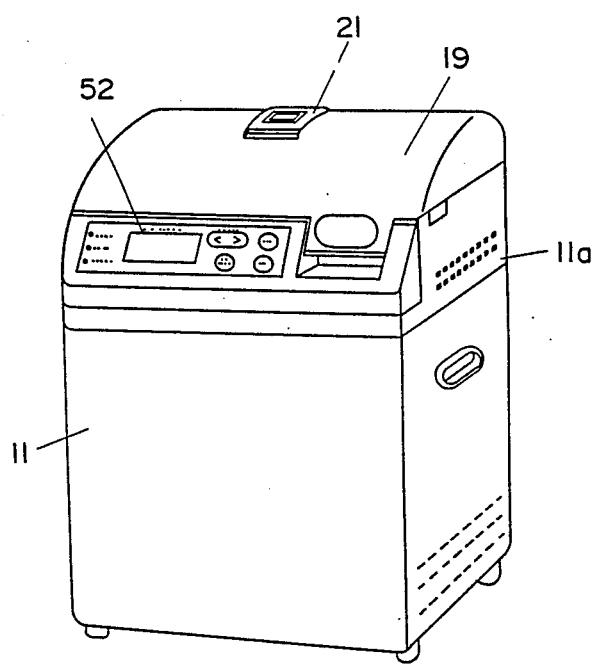
FIG. 7 is a perspective view of the bread producing machine.

In each step, the fan 48 provided on the exhaust route 51 is turned on to operate during the mixing, kneading operation and the steam step, but in summer (when the room temperature is high], when the fan 48 is operated during the mixing, kneading of the bread materials, as shown by an arrow of FIG. 2, the outside air is sucked from the outer air inlet port 37 disposed on one portion of the outer cover 19 and the air is fed into the baking case 17 and the baking chamber 15 through the inner side air inlet port 39 having the filter, and the air is exhausted from the outer exhaust port 41 through the exhaust lowering portion 50, the exhaust duct 46 and the inner side exhaust port 42. When the fan 48 is operated during the mixing, kneading operation of the bread materials as described hereinabove, the air of higher humidity within the baking case 17 is exhausted so that the moisture is evaporated from the bread raw material. This retards the temperature rise of the bread raw material, through the heat caused during the mixing, kneading operation, by the evaporation latent heat (FIG. 15). Also, as the mixing, kneading operation of the bread material is continuously effected for the determined period because of this, the kneading operation is not insufficient, with a result that sufficient kneading is effected to improve the quality of the bread when the room temperature is high. Especially the film thickness for forming the air bubbles of bread becomes thinner to provide the well spread bread. Also, when the operation of the fan 48 has been effected from the start of the mixing, kneading step of the bread materials, the bread materials such as wheat flour, etc. within the baking case 17 are entrained in the exhaust to be exhausted outside. However, in the other embodiment of the present invention, the operation of the fan 48 is adapted to be delayed in the course of the mixing, kneading step of the bread materials, i.e., after the bread raw material is produced to some extent (at least for one minute), and the problem with the wheat flour, etc. being exhausted outside may be solved.

It is to be noted that a combustor, a high frequency heater or the like in addition to the electric heater shown in the above-described embodiment is considered as a heating means, also, the mixing, kneading means is not restricted to a kneading blade as in the embodiment.

As described hereinabove, a bread producing machine of the present invention is provided with an air inlet route including a baking chamber, and an exhaust route. A fan for compulsory blast use is disposed in the course of the exhaust route, the exhaust route is positioned at its one end above the baking case and is confronted with the upper portion side wall of the baking chamber as an air inlet port and is confronted at its other end with the outer side exhaust port provided in the outer cover, so that the air introduced into the baking chamber from the air inlet route by the driving of the fan is adapted to be discharged from the outer side exhaust port provided through the exhaust route from the air inlet port. In this case, the ventilation form becomes a suction type to set the baking chamber into a negative pressure region, with a result that in the steaming step after the bread baking step, not only the steam on the top face of the bread, but also the steam existing in the gap of the periphery of the bread and the baking case may be exhausted positively and quickly. Thus, swollen, delicious bread may be easily produced.

Also, as the exhaust route is positioned at its one end above the baking case, is confronted with the top portion side wall of the baking chamber as an air inlet, and is confronted at its other end with the outer side exhaust port provided in the outer cover, the steam which has been sucked into the exhaust route from within the baking chamber is not returned into the baking chamber again, so that the positive steam exhausting is effected.

We claim:

1. An apparatus for producing bread, comprising
an outer case;
a baking chamber within said outer case, said baking chamber having at least one side wall;
a baking case detachably securable within said baking chamber for receiving bread raw materials;
means for kneading the bread raw materials within said baking case;
means disposed within said outer case for heating said baking case;
air inlet means allowing communication between the atmosphere and said baking chamber and therefore said baking case; and
air exhaust means allowing communication between said baking chamber, and therefore said baking case, and the atmosphere, said air exhaust means including an exhaust air inlet port located in said side wall of said baking chamber at a position at least partially above said baking case, an exhaust air exhaust port on said outer case, exhaust duct means providing air communication between said inlet port and said exhaust port, and fan means disposed within said exhaust duct means for drawing a flow of air into said inlet port and blowing the air out of said exhaust port, whereby the air pressure within said baking chamber, and therefore said baking case, is reduced during operation of said fan means.

2. An apparatus as in claim 1, further comprising control means operatively connected to said means for heating said case and to said fan means, said control means causing operation of both said means for heating said case and said fan means during a steam venting operation.

3. An apparatus as in claim 2, wherein said control means causes the energization ratio of both said means for heating said case and said fan means to be reduced with time during said steam venting operation.

4. An apparatus as in claim 1, further comprising control means operatively connected to said means for kneading and to said fan means, said control means causing operation of said fan means during operation of said means for kneading, said control means initiating operation of said fan means a set period of time after initiating operating of said means for kneading.

* * * * *